Figure 1:
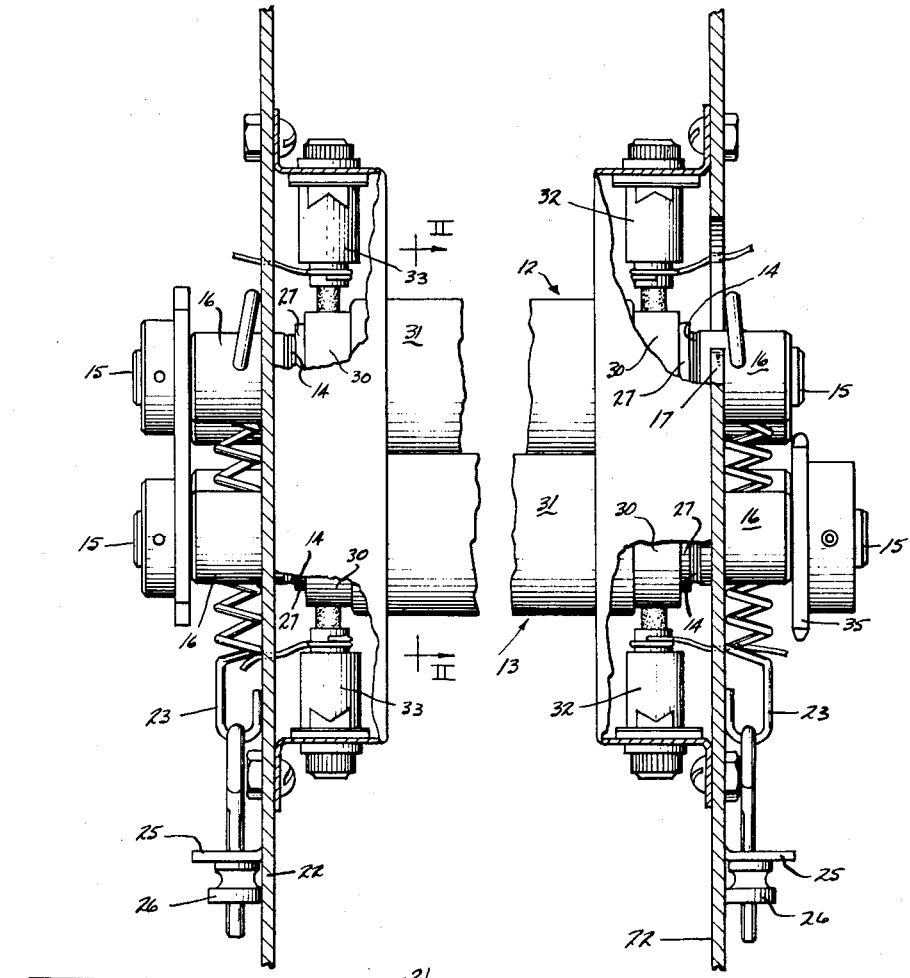

June 23, 1964 L. A. BRACICH 3,138,695
LAMINATING APPARATUS
Filed Jan. 24, 1961

INVENTOR.
Louis A. Bracich
BY
ATTORNEYS

United States Patent Office 3,138,695
Patented June 23, 1964

3,138,695
LAMINATING APPARATUS
Louis A. Bracich, Chicago, Ill., assignor to General Binding Corporation, Northbrook, Ill., a corporation of Illinois
Filed Jan. 24, 1961, Ser. No. 84,641
5 Claims. (Cl. 219—244)

The present invention relates to a laminating apparatus and, more particularly, relates to an improved roll and laminate heating apparatus for cohesively uniting a plurality of relatively thin sheets with one another.

As those familiar with the art of laminating are aware, devices have been proposed in the past for laminating a sheet of paper or the like with a plastic transparent film or sheet bonded thereto on one or both sides. The lamination of paper with plastic sheets on opposite sides thereof has proved a very satisfactory technique for preserving the paper against the normal effects of age and/or tampering. Apparatuses employed in the past for accomplishing such lamination have been relatively diversified and for the most part quite complicated either as to the apparatus or the manner of operating the apparatus. In particular, while devices have been provided in the past for heating the plastic sheets to be laminated on opposite sides of a sheet of paper, or the like, immediately prior to passage of the plastic sheets and paper through a pair of pressure rollers, the application of heat evenly to the laminating materials at the exactly correct instant has proven extremely difficult.

In accordance with the present invention, a greatly simplified combined laminate pressurizing and heating apparatus is provided. The apparatus of the present invention is composed of a minimum of working parts and as a result of the continuous and uniform application of heat immediately ahead of and also precisely at the point of pressurization of the laminating materials, substantially uniform laminations are provided with a minimum of control adjustments.

In accordance with the present invention, a transparent laminating film, such as for example, Mylar polyester film, with the surface thereof facing the paper sheet to be laminated coated with a polyethylene adhesive of the type which becomes tacky when subjected to heat. This material is preferably stored on a roll positioned adjacent the pressurizing rolls of the laminating apparatus and is fed between the pressurizing rolls simultaneously with a sheet of paper or the like to be laminated with the film. No heat is applied to the paper or the laminating film prior to their contact with the rolls. Instead, in accordance with the present invention, the surface of the pressurizing rolls, which surface is a resilient rubber material, is uniformly electrically conductive. Electrical current is passed through the conductive outermost layer of the resilient pressurizing rolls at a controlled voltage to provide an electrical heating effect which is uniform at the surface of the pressurizing rolls for evenly heating of the laminating materials in a consistently uniform manner precisely at the point of pressurization. As a result of the uniformity thus achievable and as a result of the application of the uniform heat to the plastic laminating materials at the point of pressurization, and for a controlled distance prior to the pressurization, the laminating apparatus becomes essentially insensitive to variations in room temperature and ambient air conditions. Further, the heat retentivity of the plastic material itself, and the tacky polyethylene or similar adhesive, becomes less critical to the laminating apparatus.

It is, accordingly, an object of the present invention to provide an improved laminating apparatus.

Another object of the invention is to provide a thin sheet laminating apparatus providing uniformity of heating precisely at the point of pressurization of the laminates.

A further object of the invention is the provision of plastic laminating rolls constructed of elastomeric material, the surface of which is electrically conductive.

Yet a further object of the invention is the provision of a substantially improved laminating apparatus capable of providing continuously uniform heat at the pressure nip of the laminating rolls.

A feature of the invention is the construction of laminating rolls from electrically conductive elastomeric material and the application of an electrical current to the rolls to provide a uniform surface heating thereof.

Figure 2:
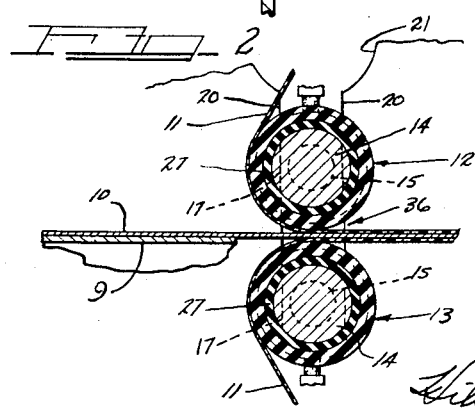

Still other and further objects and features of the present invention will at once become apparent to those skilled in the art from a consideration of the attached specification and drawings wherein a preferred embodiment of the invention is shown by way of illustration only, and wherein:

FIGURE 1 comprises an end elevation view, partly broken away, of a laminating apparatus constructed in accordance with the principles of the present invention; and FIGURE 2 is a cross-sectional view taken along the line II—II of FIGURE 1.

As shown on the drawings:

As may be seen from a consideration of FIGURES 1 and 2 of the drawings, the present invention contemplates the lamination of a sheet of paper or the like 10 on one or both sides with a plastic film 11. For example, I have found that Mylar polyester film having one of its surfaces coated with a polyethylene adhesive which becomes tacky when subjected to heat, may be satisfactorily used as a plastic laminating film where a transparent protective sheet is desired. This material, which is commercially available, is a highly durable, transparent, water repellant film characterized by very high strength and chemical inertness. I have found that this material having a combined thickness approximately 1 mil comprised of about ½ mil thickness of Mylar with ½ mil polyethylene, provides a very satisfactory laminating film. This film may readily be stored on rolls, preferably forming a portion of the laminating apparatus as such. These rolls, not shown on the drawings of the present application, permit removal from the rolls to a position for pressurization as illustrated in FIGURE 2.

In the apparatus illustrated, the rolls are generally indicated at 12 and 13. The rolls 12 and 13 are the same in construction and comprise cores 14 which are mounted for rotation on reduced diameter bearing extensions 15 in bearing blocks 16. The bearing blocks 16 are cylindrical in construction and are provided with transverse notches 17 for cooperation with the edges 20 of keyhole slots 21 in the apparatus housing 22. In the illustrated arrangement, the upper rolls is resiliently biased downwardly into pressurized engagement with the lower roll by means of springs 23 secured to the upper bearing blocks 16 and adjustably secured to the housing walls 22 by means of brackets 25 and threaded adjusting nuts 26.

As may be more clearly seen from FIGURE 2, the core 14 of each of the rolls is provided with a cylindrical dielectric layer or coating 27 over which is bonded a cylindrical resilient elastomeric material. In accordance with the present invention, the resilient roll material comprises a conductive silicone rubber compound. This material, one form of which is, for example, marketed under the trade designation "K–1516" by the Union Carbide Corporation, is electrically conducting. The material is molded to retain its elasticity and has, in the arrangement illustrated, been successfully commercially employed for successful laminating when operated in the range of 250° to 350° F. at a roll speed of approximately 6' per minute. In accordance with the present invention, the roll heat is attained by passing current directly through the conductive material. This material has an electrical resistance approximating 50 ohms over the length of an 11" roller and as a result of this electrical resistance, provides a uniform heat over the entire roll periphery upon the application of electrical current. Current is applied to the rolls by means of annular slip rings 30 which are secured to the outer surface of the dielectric material 27 and bonded to the elastomeric roll material 31. Electrical current is applied to both rolls simultaneously and the polarity of the pair of brushes 32 at the right-hand end of the rolls, as viewed in FIGURE 1, is the same and opposite to the polarity of the brushes 33 at the left-hand end of the rolls, as viewed in FIGURE 1.

Rotary power may be applied to the rolls in any convenient manner. In the construction illustrated, the lower roll is power driven by means of a sprocket wheel 35 driven by a conventional chain, not shown. It is ordinarily unnecessary to drive both rolls in view of their pressure contact with each other. However, it will be understood that both rolls may, if desired, be individually power driven.

In accordance with the present invention, heat is provided at the outermost peripheral surface of the rollers in a uniform manner. No heat is lost or wasted. Instead, the heat is applied precisely at the point of pressurization, or in other words, at the nip 36 between the rolls. Preferably, as shown in FIGURE 2, the plastic roll material is delivered to the rolls 12 and 13 from a point generally transverse to the plane of the paper 10 which is aligned for movement between the rolls 12 and 13 by guide 9, so that the plastic film is in contact with the heated roll surface for a portion of its travel, thereby rendering the material properly heated and of the right tackiness for proper adhesion to the paper 10 as it passes between the rolls under pressure. The angle at which the plastic film approaches the rolls may, of course, be varied by changing the position of the storage rollers or by adding guide rollers at convenient joints in the apparatus. By thus changing the angle, the contact time between the roller surface and the plastic film may readily be varied, providing an additional control for the amount of heat applied to the film in advance of pressurization.

It will appear, accordingly, that an extremely simple and yet substantially more efficient laminating apparatus providing both heat and pressure has been constructed. The non-uniformity of heating and unsatisfactorily placed heating of prior art devices is completely avoided in accordance with the present invention. Accordingly, and in practice, very successful laminating has been achieved with the device of the present invention even though, due to its extremely simple design, the apparatus of the present invention is far less complex than any similar apparatus of the prior art. It will be obvious to those skilled in the art from a consideration of the above specification and drawings that variations and modifications may be made in accordance with the teachings of the present application without departing from the novel concepts of my invention. It is, accordingly, my intention that the scope of the present application be limited solely by that of the hereinafter appended claims.

I claim as my invention:

1. Plastic film laminating apparatus comprising a pair of pressure rolls mounted for rotation about spaced axes and resiliently biased into pressure engagement with each other, guide means for directing a sheet of material to be laminated between said rolls, one of said rolls directing a film of heat sensitive plastic material between said sheet and said one of said rolls, and drive means for rotating said rolls to draw said sheet and said film through the nip of the rolls in face-to-face pressurized contact, at least one of said rolls comprising a roll surface layer uniformly composed of resilient electrically conductive elastomeric material and including means passing electrical current through said roll surface layer to heat said roll surface layer uniformly to thereby uniformly heat said plastic material simultaneously with the application of pressure thereto.

2. Plastic film laminating apparatus comprising a pair of pressure rolls mounted for rotation about spaced axes and resiliently biased into pressure engagement with each other, guide means for directing a sheet of material to be laminated into the nip formed by said rolls, said rolls directing a film of heat sensitive plastic material on each side of said sheet for pressurization against opposite sides of said sheet by said rolls, and drive means for rotating said rolls to draw said sheet and said film through the nip thereof in face-to-face pressurized contact, said rolls each comprising a roll surface layer uniformly composed of resilient electrically conductive elastomeric material and including means passing electrical current axially through said surface layer of the roll in the same direction in both rolls to heat each said roll surface layer uniformly and to thereby uniformly heat said plastic material simultaneously with the application of pressure thereto.

3. Plastic film laminating apparatus comprising a pair of pressure rolls mounted for rotation about spaced axes and resiliently biased into pressure engagement with each other, guide means for directing a sheet of material to be laminated into the nip formed by said rolls, said rolls directing a film of heat sensitive plastic material on each side of said sheet for pressurization against opposite sides of said sheet by said rolls, and drive means for rotating said rolls to draw said sheet and said film through the nip thereof in face-to-face pressurized contact, at least one of said rolls comprising a roll surface layer uniformly composed of resilient electrically conductive elastomeric material and including means passing electrical current axially through said one roll surface layer to heat said plastic material simultaneously with the application of pressure thereto while passing between said rolls.

4. A pair of combined heating and pressing laminating rolls comprising a pair of spaced rotatable cores each having a generally cylindrical coat of dielectric material therearound, each of said rolls having a resilient electrically conductive elastomeric surface layer uniformly mounted on said dielectric, and each of said rolls having annular slip rings mounted at opposite ends thereof and in electrical contact with said elastomeric surface layer, electrical contact means in continuous contact with each of said rings, and electrically conducting means directly connecting the annular rings on adjacent ends of the two rolls to each other whereby current flowing through the elastomeric material of the rolls flows in the same direction in both rolls.

5. Plastic film laminating apparatus comprising a pair of pressure rolls mounted for rotation about spaced axes resiliently biased into pressure engagement with each other, guide means for directing a sheet of material to be laminated into the nip formed by said rolls, said rolls directing a film with heat sensitive plastic material on each side of said sheet for pressurization against opposite sides of said sheet by said rolls, drive means for rotating said rolls to draw said sheet and said film through the nip thereof in face-to-face pressurized contact, said rolls contacting said film of plastic material at a point substantially in advance of said nip, said rolls each comprising a roll surface layer uniformly composed of resilient electrically conductive elastomeric material and including means passing electrical current through said surface layer of the roll axially of both rolls in the same direction to heat said roll surface layers uniformly and to thereby heat said plastic material simultaneously with the application of pressure thereto in advance of the application of pressure thereto.

References Cited in the file of this patent

UNITED STATES PATENTS

| | | |
|---|---|---|
| 1,401,303 | Baldwin | Dec. 27, 1921 |
| 1,480,805 | Hadley | Jan. 15, 1924 |
| 2,097,427 | Bergstein | Nov. 2, 1937 |
| 2,154,474 | Scott | Apr. 18, 1939 |
| 2,343,975 | Hosfield | Mar. 14, 1944 |
| 2,373,876 | Cutler | Apr. 17, 1945 |
| 2,679,572 | Workman | May 25, 1954 |
| 2,685,548 | Drozdowski | Aug. 3, 1954 |
| 2,796,913 | Fener et al. | June 25, 1957 |
| 2,870,312 | Westervelt | Jan. 20, 1959 |
| 2,967,562 | Orchard | Jan. 10, 1961 |
| 3,062,698 | Aykanian | Nov. 6, 1962 |